(12) United States Patent
Takaichi et al.

(10) Patent No.: US 8,581,553 B2
(45) Date of Patent: Nov. 12, 2013

(54) SYSTEM POWER LEVELING DEVICE AND IMAGE DIAGNOSTIC SYSTEM

(75) Inventors: Yoshio Takaichi, Tokyo (JP); Naoki Ariyama, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 395 days.

(21) Appl. No.: 13/034,298

(22) Filed: Feb. 24, 2011

(65) Prior Publication Data

US 2011/0206272 A1 Aug. 25, 2011

(30) Foreign Application Priority Data

Feb. 24, 2010 (JP) .................................. 2010-038374

(51) Int. Cl.
 *H02J 7/00* (2006.01)
(52) U.S. Cl.
 USPC .......................................................... 320/132
(58) Field of Classification Search
 USPC .......................................................... 320/132
 See application file for complete search history.

(56) References Cited

U.S. PATENT DOCUMENTS

| | | | |
|---|---|---|---|
| 4,435,677 A * | 3/1984 | Thomas ........................ | 323/235 |
| 4,857,821 A | 8/1989 | Takeda | |
| 5,295,078 A * | 3/1994 | Stich et al. .................... | 700/297 |
| 5,969,509 A | 10/1999 | Thorvaldsson | |
| 6,876,179 B2 | 4/2005 | Chou et al. | |
| 7,719,248 B1 * | 5/2010 | Melanson ...................... | 323/283 |
| 2001/0048226 A1 * | 12/2001 | Nada ............................ | 290/40 C |
| 2002/0047309 A1 * | 4/2002 | Droppo et al. ................. | 307/43 |

FOREIGN PATENT DOCUMENTS

JP 2002-271993 9/2002

* cited by examiner

*Primary Examiner* — Arun Williams
(74) *Attorney, Agent, or Firm* — Armstrong Teasdale LLP

(57) ABSTRACT

A system power leveling device includes a bidirectional converter connected to a system bus line providing a electric power to a load from a power source and having a first and a second switching element, a power storage device connected to the bidirectional converter, a first specifying section for specifying a power consumption of the load, a charge-discharge control section for controlling the charge and the discharge of the power storage device by controlling the bidirectional converter based on the power consumption specified at the first specifying section, and a second specifying section specifying a current or an electric power of the charge or the discharge.

18 Claims, 12 Drawing Sheets

SYSTEM POWER LEVELING DEVICE AND IMAGE DIAGNOSTIC SYSTEM

CROSS REFERENCE TO RELATED APPLICATIONS

This application claims the benefit of Japanese Patent Application No. 2010-038374 filed Feb. 24, 2010, which is hereby incorporated by reference in its entirety.

BACKGROUND OF THE INVENTION

Present invention relates to a system power leveling device for leveling system power using a bidirectional converter and a power storage device, and image diagnostic systems having the device.

For the purpose such as to reduce the burden for power-supply systems using electrical equipments, a variety of methods for leveling the system power of the electrical equipments are invented (in this specification, "the system power" is used to refer electric power provided to the electrical equipments from the power source). For example, a power storage device is connected via a bidirectional converter to a system bus line in the electrical equipments which provides electrical power to a load from a power source. Then control the bidirectional converter to specify the power consumption of the load, charge the power storage device when the consumed power is small and discharge the power storage device when the consumed power is large. That is, when the power consumption of the load is small, a part of the system power is stored in the power storage device, and when the power consumption of the load is large, the stored energy is used to make up for a part of the power consumption of the load. (for example, see the abstract of Japanese Unexamined Patent Application No. 2002-271993). As a result, the system power is leveled.

BRIEF DESCRIPTION OF THE INVENTION

The bidirectional converter comprises a switching element for step down and a switching element for step up. By operating a switching operation of the switching element for step down, that is to operate alternately and repeatedly switch "on" and "off", while the switching element for step up is turned "on", the step-down converter is activated to charge the power storage device. By operating the switching operation of the switching element for step up while the switching element for step down is turned "off", the step up converter is activated to discharge the storage device. For such switching operation, the duty ratio of PWM, or a ratio of the "on" period and the "off" period to one cycle of on-off period is feedback controlled, by such as Proportional-Integral-Derivative (PID) control, using the pulse width modulation (PWM) such that that the current or electric power of the charge-discharge approaches a target value. Also, the gain parameter of the feed-back control is generally set so as to gain the response characteristics which are relatively moderate for preventing over-shoot of the charge-discharge current upon the rapid change of the power consumption under the load.

Meanwhile, depending on types of electrical equipments, power consumptions may change rapidly and widely despite in a normal operation. For example, image diagnostic systems, such as a X-ray CT (Computed Tomography) system, a chest X-ray systems, or a MR (Magnetic Resonance) system are major examples. Such image diagnostic systems have loads consuming bulk power, such as X-ray generating section or a magnetic field generating section, and frequently, on/off switching of such loads are performed momentary and repeatedly during operation.

When the above-mentioned method for leveling power is applied for such electrical equipments of which power consumption under loads change rapidly and widely, convergence of the current to the target value in the charge-discharge of the power storage device cannot catch up with the change of the power consumption under the loads because of the moderate response characteristics at the above feed-back control. As a result, the system power is not leveled properly and there is a risk that the system power may exceed the predetermined power; therefore, the burden to the power-supply systems cannot be reduced.

Because of such reason, a system power leveling device which levels the system power even if the power consumption under the load changes rapidly and greatly, and image diagnostic systems containing the device are required.

An invention of a first aspect comprises a bidirectional converter connected to a system bus line providing a electric power to a load from a power source and having a first and a second switching element; a power storage device connected to the bidirectional converter; a first specifying section for specifying a power consumption of the load; a charge-discharge control section controlling the charge and the discharge of the power storage device by controlling the bidirectional converter based on the power consumption specified at the first specifying section; and a second specifying section specifying a current or an electric power of the charge or the discharge.

The charge-discharge control section has a first on/off control section for, when the charge or the discharge is performed, while one of the first and the second switching elements is kept "off", keeping the other "on" or "off" until a difference between a target value of the current or the electric power of the charge or the discharge and a specified value by the second specifying section becomes smaller than a first threshold, and then feed-back controlling such that the specified value approaches the target value.

An invention of a second aspect provides the system power leveling device according to the first aspect, wherein the charge-discharge control section comprises a determining section for determining whether the difference is larger than a second threshold which is larger than the first threshold, when starting the charge or the discharge; and a second on/off control section for, when the charge or the discharge is performed, while on of the first and the second switching element is kept off, feed-back controlling such that the specified value approaches target value, by using a pulse width modulation for an on/off operation of the other switching element.

In the case when the determining section determines that the difference is larger than the second threshold by the determining section, a control by the first on/off control section is performed, and in the case when the difference is equal to or less than the second threshold by the determining section, a control by the second on/off control section is performed.

An invention of a third aspect provides the system power leveling device according to the first or second aspect, wherein, the power source is an alternating-current power source; the first specifying section specifies the power consumption under the load at a cycle of a wave form of the alternating-current power source or at every period of a predetermined number of the cycle; and the charge-discharge control section controls the charge and discharge based on most recent predetermined number of times of the power consumption specified by the first specifying section.

An invention of a fourth aspect provides the system power leveling device according to the third aspect, wherein the predetermined number of times is an integral number within a range from 1 to 10.

An invention of a fifth aspect provides the system power leveling device according to the third or fourth aspect, wherein the first specifying section is synchronized with a zero-cross phase of the alternating-current power source and specifies the power consumption under the load.

Here the "zero-cross phase" is a phase that a current wave form of a alternating-current power source intersects a voltage of a neutral phase (it is normally defined as "zero volt").

An invention of a sixth aspect provides the system power leveling device according to one the third to fifth aspect, wherein the charge-discharge control section starts the charge when a representing value of the power consumption for most recent N1 cycle specified at the first specifying section becomes less than a threshold TH1, and ends the charge when a representing value of the power consumption for most recent N2 cycle of specified at the first specifying section becomes equal to or more than a threshold TH2. The charge-discharge control section starts the discharge when a representing value of the power consumption for most recent N3 cycle specified at the first specifying section becomes equal to or more than a threshold TH3, and ends the discharge when a representing value of the power consumption for most recent N4 cycle specified at the first specifying section becomes less than a threshold TH4. The TH1, TH2, TH3, and TH4 are in a relationship of TH1≥TH2>TH4≥TH3.

An invention of a seventh aspect provides the system power leveling device according to of the sixth aspect wherein the N1, N2, N3, and N4 are integer numbers within a range from 1 to 10.

An invention of a eighth aspect provides the system power leveling device according to the seventh aspect, wherein the alternating-current power source is a three-phase alternating-current power source. The first specifying section specifies the power consumption of the load at every period of ⅙ of the cycle. The N1, N2, N3, and N4 are N1=N2=N3=N4=3.

An invention of a ninth aspect provides the system power leveling device according to any of the sixth, seventh, or eighth aspect, wherein at least one of combinations of the TH1 and TH2, and the TH3 and TH4 is a combination of values different from one another.

An invention of a tenth aspect provides the system power leveling device according to any of the sixth, seventh, eighth, or ninth aspect. Wherein a target value of an electric power of the charge is an electric power value evaluated by subtracting a maximum electric power burdening the power source from a representing value of the power consumption for most recent N5 cycle specified at the first specifying section.

An invention of a eleventh aspect provides the system power leveling device according to any of the sixth, seventh, eighth, ninth, or tenth aspect, wherein the representing value is an average value, an intermediate value, a middle value, or a value corresponding to an apparent value.

An invention of a twelfth aspect provides the system power leveling device according of any of from the first to eleventh aspect, wherein the target value of the current of the charge is a predetermined fixed value.

An invention of a thirteenth aspect provides the system power leveling device according to any of from the first to twelfth aspect, wherein the feed-back control includes PID control, H-infinity (∞) control, or LQI control.

An invention of a fourteenth aspect provides the system power leveling device according to any of from the first to thirteenth aspect, wherein the power storage device includes an electric double layer capacitor.

An invention of a fifteenth aspect provides an image diagnostic device comprising the system power leveling device according to any of from the first to fourteenth aspect.

An invention of a sixteenth aspect provides an image diagnostic device according to the fifteenth aspect, comprising a X-ray generating unit as at least one portion of the load wherein an X-ray CT photography is performed by using the X-ray generating unit.

An invention of a seventeenth aspect provides an image diagnostic device according to the fifteenth aspect, comprising a X-ray generating unit as at least one portion of the load, wherein an X-ray photography is performed by using the X-ray generating unit.

An invention of a eighteenth aspect provides an image diagnostic device according to the fifteenth aspect, comprising a magnetic field generating unit as at least one portion of the load, wherein a MR photography is performed by using the magnetic filed generating unit.

According to the system power leveling device of above-mentioned aspects of the present invention, in the charge-discharge of the power storage device, the switching elements of the bidirectional converter are kept either "on" of "off" once and the current or electric power of the charge or the discharge is raised or lowered at once close to a target value, then on/off of the switching elements can be feedback controlled with a pulse width modulation. Also, even if the current or electric power of the charge or the discharge is away from the target value, the current of electric power of the charge or the discharge can be converged rapidly to the target value not accompanying a transitional phenomenon, such as overshoot. Because of this, even if the power consumption of under the load changes rapidly and widely, the system power can be leveled.

DETAILED DESCRIPTION OF THE INVENTION

Embodiments of present invention will be explained below.

Figure 1:
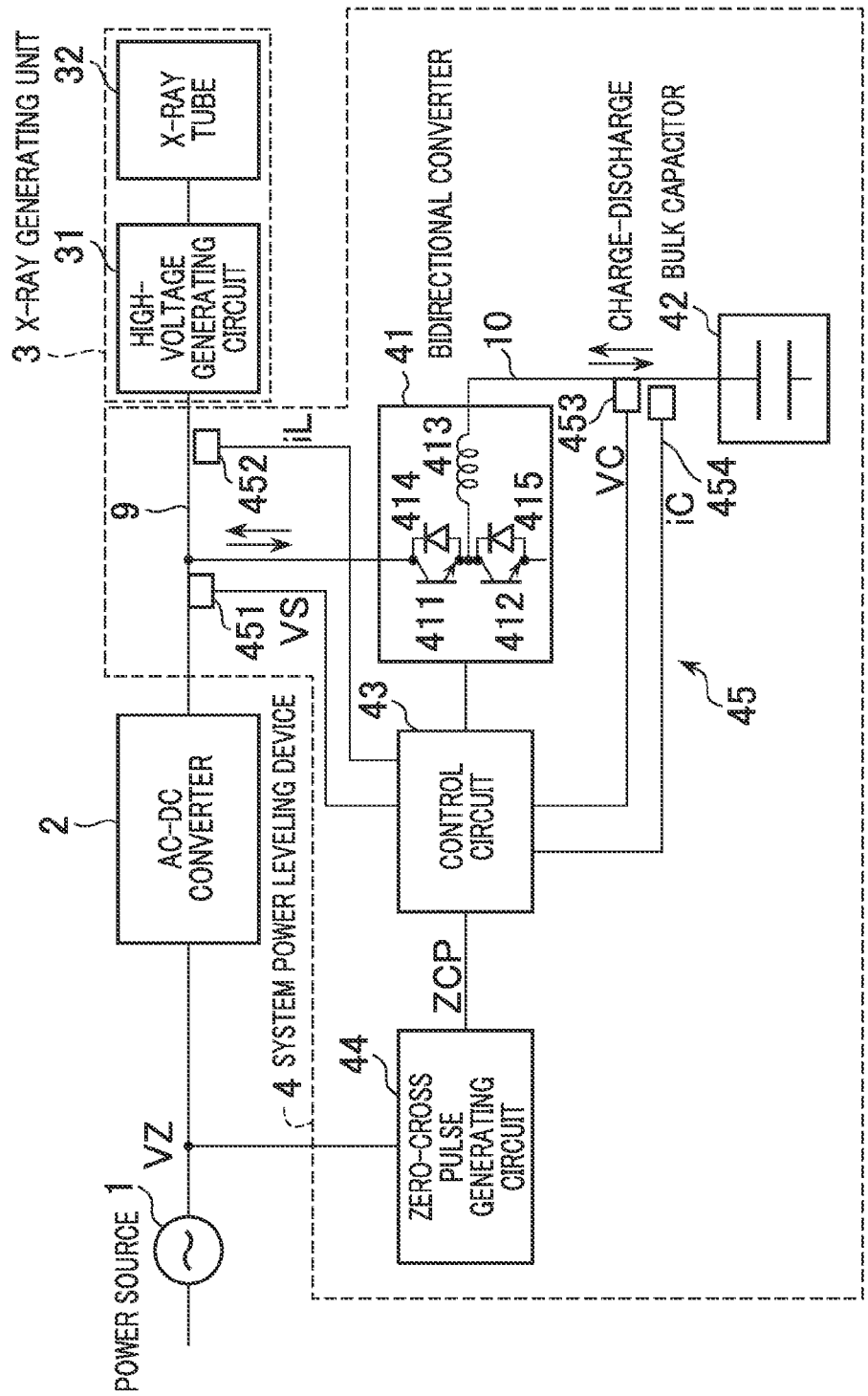
FIG. 1 is a schematic view showing configuration of an X-ray CT system of embodiment of the present invention.

FIG. 1 is a schematic view showing configuration of a X-ray CT system of embodiment of present invention.

As shown in FIG. 1, the X-ray CT system 100 is connected to a power source 1 and is provided electric power from the power source 1. For example, the power source 1 can be achieved as a power of an electric transformer connected to an electric power system provided by electric companies. Here, the power source 1 is an alternating three-phase power source and the electric power specification is 480 [VAC], 50 [Hz], for example.

The X-ray CT system 100, as shown in FIG. 1, comprises an AC-DC converter 2 and an X-ray generating unit 3. The X-ray generating unit 3 further comprises a high-voltage generating circuit 31 and an X-ray tube 32. The AC-DC converter 2 is connected to the power source 1 and converts the alternating voltage of the power source 1 to direct voltage. The high-voltage generating circuit 31 is connected to a DC output side of the AC-DC converter via a system bus line 9 and provides an electric power of high voltage to the X-ray tube 32 upon request of X-ray generation. The X-ray tube 32 generates X-rays by receiving the electric power supply. The X-ray generating unit 3 is a part of the load under the X-ray CT system 100 and consumes bulk electric power momentarily at the X-ray generation. Note that the AC-DC converter 2 can be a rectifier including, such as a diode bridge.

The X-ray CT system 100, as shown in FIG. 1, comprises a system power leveling device 4. The system power leveling device 4 comprises a bidirectional converter 41, a bulk capacitor 42, a control circuit 43, a zero-cross pulse generating circuit 44, and a voltage/current detecting section 45. The capacitor is also referred to as a condenser. The bidirectional converter 41 is one example of the bidirectional converter of present invention, the bulk capacitor 42 is one example of the power storage device of present invention, and the control circuit 43 is one example of the charge-discharge control section, and the first and the second specifying sections of the present invention.

The bidirectional converter 41 is connected to the system bus line 9 and the bulk capacitor 42 is connected to the bidirectional converter 41 via a conductive wire 10. Here, the bulk capacitor 42 is comprised of a plurality of electric double-layer capacitors. Note that the bulk capacitor 42 can be comprised of a polymeric capacitor. Instead of the bulk capacitor, a secondary battery performing a discharge by chemical reaction can be used as the power storage device.

The bidirectional converter 41 comprises a first switching element 411, a second switching element 412, a reactor 413, a first diode 414, and a second diode 415. The reactor can be referred as a coil. The first switching element 411 and the second switching element 412 form a series circuit and are connected to the system bus line 9. One end of the reactor 413 is connected to a connecting point of these switching elements 411, 412. The first diode 414 is connected in parallel with the first switching element 411 such that the direction of the current flow thereof being opposite to that of the first switching element 411. The second diode 415 is connected in parallel with the second switching element 412 such that the direction of the current flow thereof being opposite to that of the second switching element 412. A transistor, for example, can be used as the first and second switching elements 411, 412. The first switching element 411 functions as a switching element for step down, and the second switching element 412 functions as a switching element for step up.

The bulk capacitor 42 is connected to the other side of the reactor 413.

The first switching element 411 is operated in switching operation (operation repeatedly switching "on" and "off") while the second switching element 412 is kept "off", it is switched to a step-down DC-DC converter and a charge of the bulk capacitor 42 is performed. That is, when the first switching element 411 is turned "on", the current flows in a loop of the power source 1, the system bus line 9, the first switching element 411, the reactor 413, the conductive wire 10, the bulk capacitor 42, and the power source 1, and the current value keeps rising. When the first switching element is turned "off", the current value keeps lowering.

Meanwhile, the second switching element 412 is operated in the switching operation while the first switching element 411 is off, it is switched to a step-up DC-DC converter and a discharge of the bulk capacitor 42 is performed. That is, when the second switching element 412 is turned "on", the current flows in a loop of the bulk capacitor 42, conductive wire 10, the reactor 413, and the second switching element 412, the bulk capacitor 42, and the current value keeps rising. In this condition, electric energy is stored in the reactor 413. Next, when the second switching element 412 is turned "off", the electric energy stored in the reactor 413 is discharged, and the discharged energy flows in a loop of the bulk capacitor 42, the conductive wire 10, the reactor 413, the first diode 414, the system bus line 9, the X-ray generating unit 3, the bulk capacitor 42. The current value is at the highest level when it is turned off and then it lowers gradually.

The bidirectional converter 41 performs on/off operation of the first and second switching elements 411, 412 in response to the control of the control circuit 43.

Figure 2:
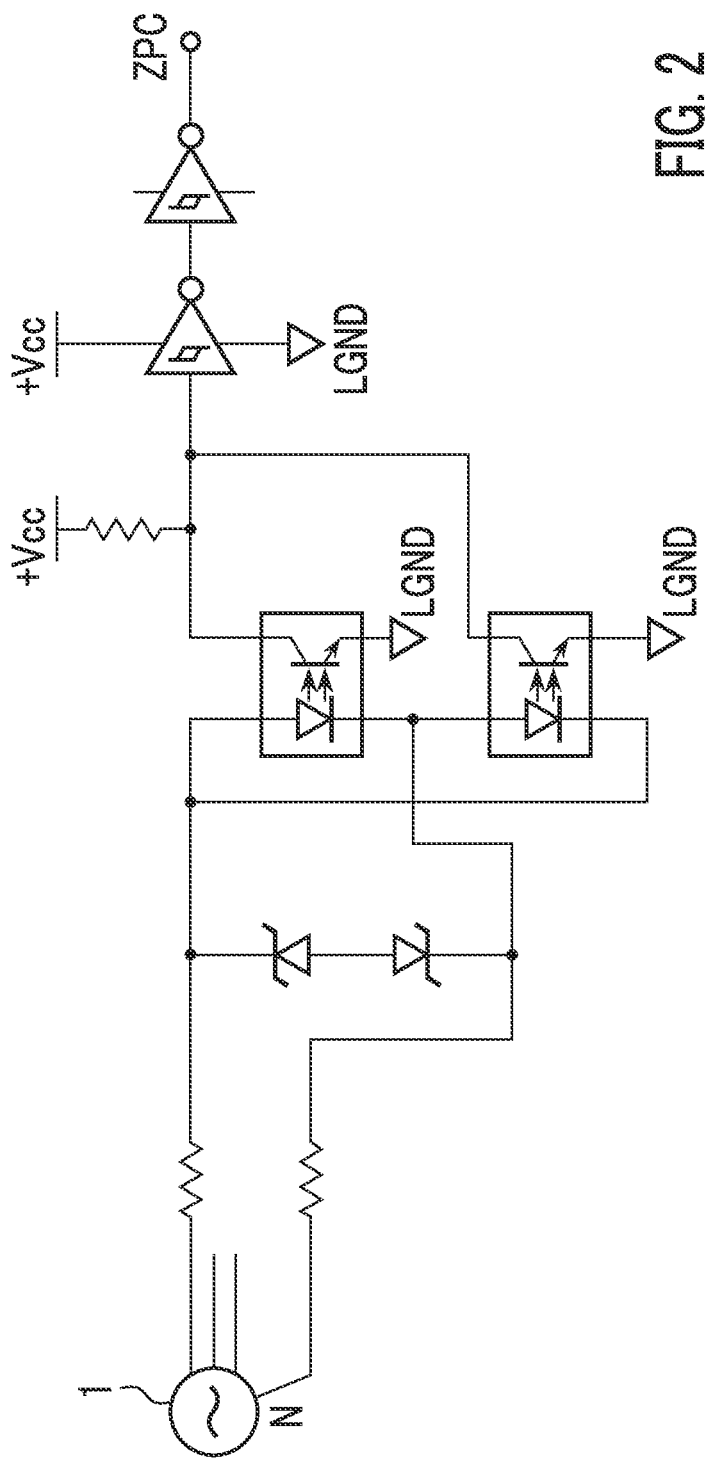
FIG. 2 shows a specific example of a zero-cross pulse generation circuit.
Figure 3:
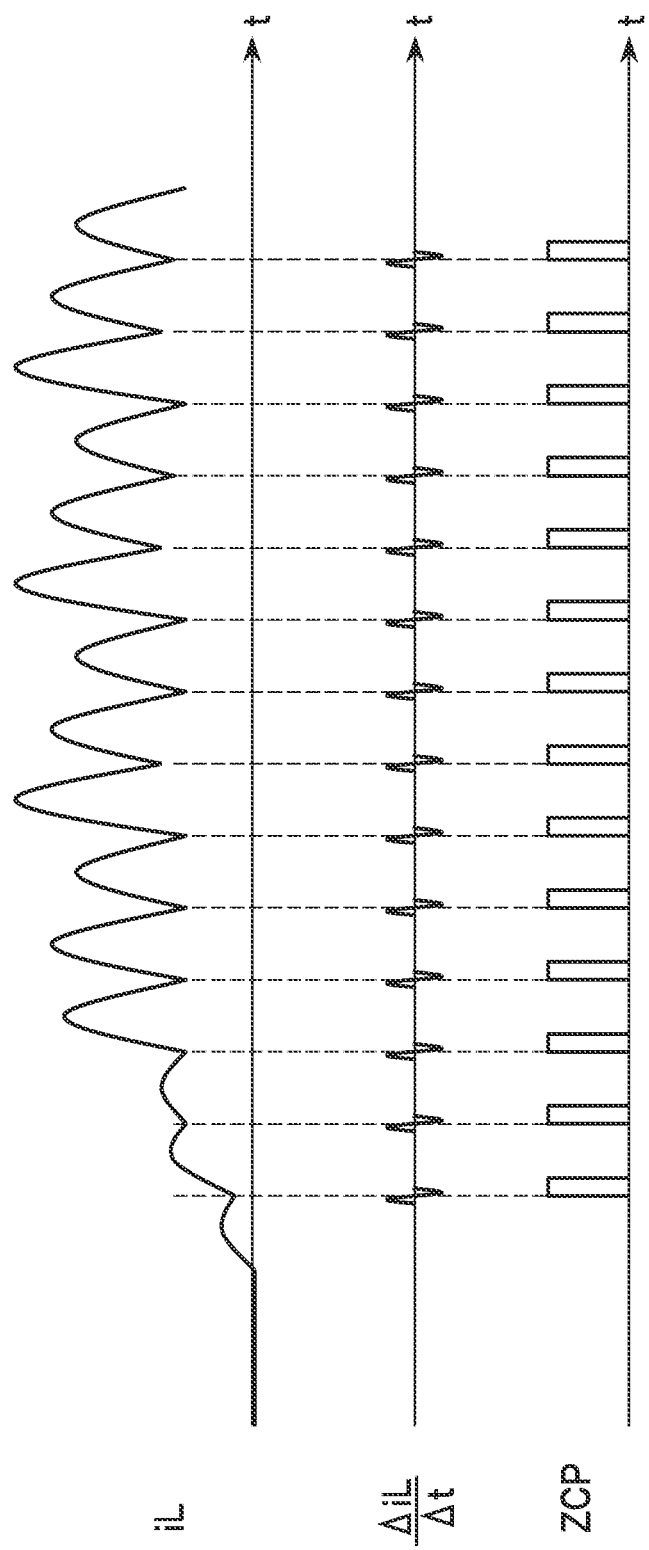
FIG. 3 shows a relationship between a differential of ripple current under load current and the zero-cross pulse generated based on it.

The zero-cross pulse generating circuit 44 is connected to the power source 1 and the control circuit 43. The zero-cross pulse generating circuit 44 monitors a voltage wave form of any of one phase of the three-phase alternating power source which is the power source 1 and generates a zero-cross pulse ZPC which is synchronized with zero-cross phase intersecting with the voltage of middle phase (zero voltage) of the three-phase alternating source. Then, the generated zero-cross pulse ZCP is output to the control circuit 43. FIG. 2 shows a specific example of a zero-cross pulse generation circuit 44. Note that, as explained later, when the power source is an alternating source, ripple current is superimposed with the load current. Thus, as shown in FIG. 3, the differential part $\Delta iL/\Delta t$ of the ripple current of the load current iL is detected by an alternating-current converter and the zero-cross pulse ZCP can be generated based on the result.

The voltage/current detecting section 45 further comprises a first voltage detecting section 451, a first current detecting section 452, a second voltage detecting section 453, and a second current detecting section 454. The first voltage detecting section 451 detects the voltage of system bus line 9, or the input voltage to the high-voltage generating circuit 31 as a load voltage VS. The first current detecting section 452 detects the current flowing in the high-voltage generating circuit 31 side of the system bus line 9, or input voltage to the high-voltage generating circuit 31, as a load voltage iL. The second voltage detecting section 453 detects the voltage of the conductive wire 10, or the voltage of the bulk capacitor 42, as a capacitor voltage VC. The second current detecting section 454 detects the current flowing the conductive wire 10, or the current flowing the bulk capacitor 42 (=the current flowing the reactor 413), as a capacitor current iC. The voltage/current detecting section 45 is connected to the control circuit 43 and outputs detected load voltage VS, load current iL, capacitor voltage VC, and capacitor current iC to the control circuit 43.

The control circuit 43 is connected to the bidirectional converter 41, the zero-cross pulse generating circuit 44, and the voltage/current detecting section 45. The control circuit 43 specifies sequentially the power consumption P of the X-ray generating unit 3 at predetermined timings based on the zero-cross pulse ZCP, the load voltage VS, and the load current iL being input. Then, by threshold determination of determined power consumption P, start/end of charge control and start/end of discharge control of the bulk capacitor 42 are determined. Further, in the charging control and discharging control, the control circuit 43 specifies sequentially the voltage or current of the charge and discharge of the bulk capacitor 42 based on the capacitor voltage VC and the capacitor current iC being input. Then, the on/off of first and second switching elements 411, 412 of the bidirectional converter 41 are controlled such that the specified voltage or current converges to the predetermined value. As a result, the leveling of the system power is performed.

Processing of system power leveling by the control circuit 43 will be explained below.

Figure 4:
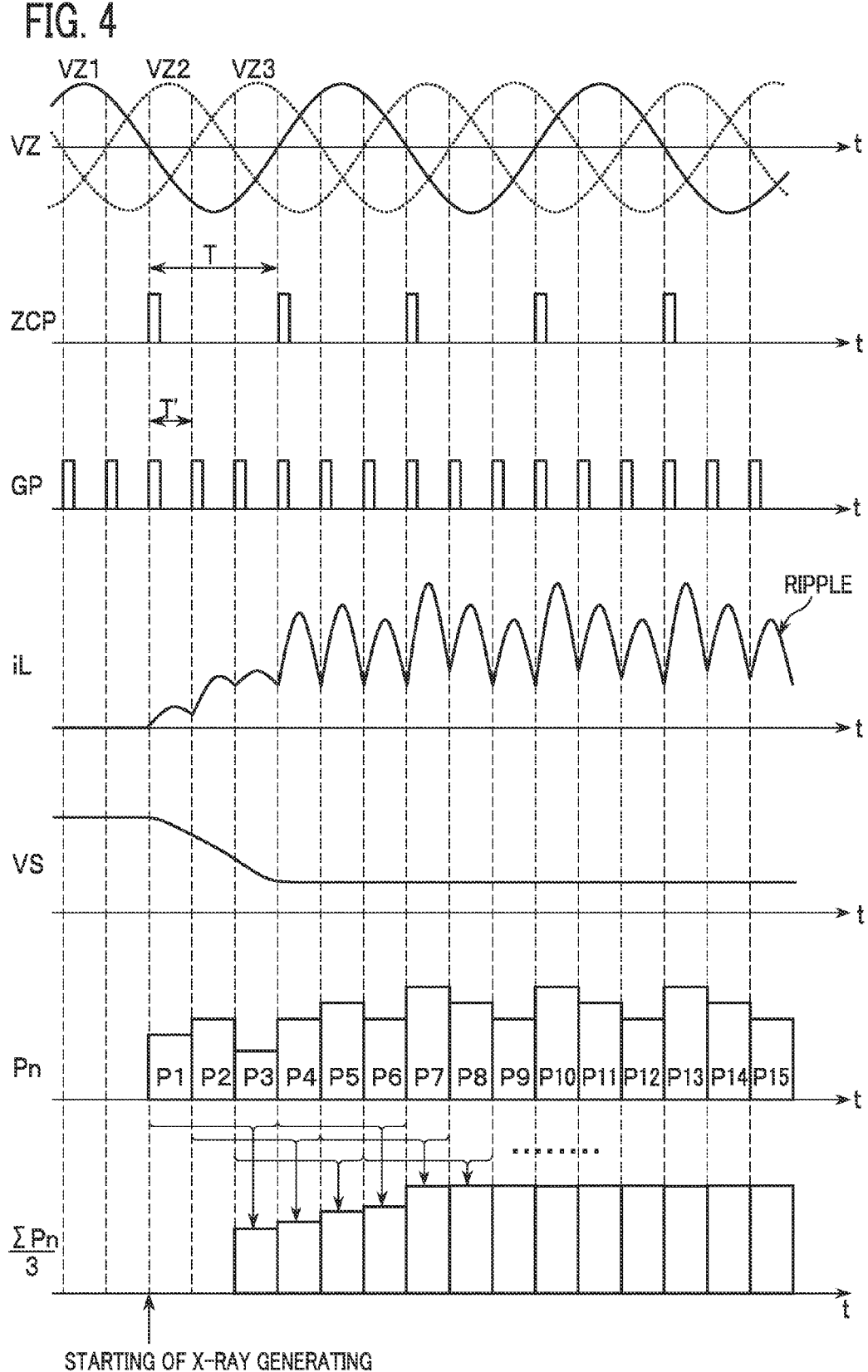
FIG. 4 is a graph showing one example of respective time changes at the given time axis of the voltage wave form of the power source, the zero-cross pulse, the load current, the load voltage, and the power consumption, under the load at the beginning of the X-ray generation.

FIG. 4 is a graph showing one example of respective time changes of the voltage wave form VZ of the power source 1, the zero-cross pulse ZCP, the load current iL, the load voltage VS, the power consumption Pn of the load, and an average value $\Sigma Pn/3$ of the power consumption Pn on the given time axis "t" at the beginning of the X-ray generation.

First of all, a method of specification of the power consumption P of the X-ray generating unit 3 and a method of decision of start/end for charge-discharge of the power consumption P by threshold determination will be explained.

Generally, when the power source is an alternating-current source, as shown with iL in FIG. 4, the ripple current is superimposed with the load current. The ripple current pulsates at the predetermined frequency corresponding to the frequency of the alternating-current source. For example, when half-wave rectification is performed for a monophase current power source, the ripple current pulsates at the same frequency of the monophase current power source, and when full-wave rectification is performed for a monophase current power, the ripple current pulsates at double frequency of the monophase current power source. When half-wave rectification is performed for the three-phase current power source, the ripple current pulsates at triple frequency of the three-phase current power source, and full-wave rectification is performed for the three-phase current power source, the ripple current pulsates at six times of the frequency of the three-phase current power source. For leveling the system power in a system that power consumption under load changes rapidly and greatly, the start/end for charge-discharge of the power storage device must be determined fast and also specification of the power consumption under the load is required to be processed rapidly. For example in the X-ray CT system, the power consumption under the load has a possibility to increase with 30 to 50 [kW] only for a period of about 100 to 200 [mS] generating X-ray. Thus, the power consumption under load is required to be specified with enough speed that start/end for charge-discharge can follow the change. In such case, in order to eliminate flaps of result by threshold determination of the power consumption under load and to stabilize charge-discharge control, it is preferable to specify the power consumption under load at a period which is the same cycle of the ripple or which is several times more than the cycle.

Frequency of alternating-current source is regulated as 50 [Hz] or 60 [Hz], but actual frequency of the current wave form tends to fluctuate within a range between ± several percent in an unloaded condition and within a range between + several percent to −20 percent in a loaded condition. Thus, it is preferable to be syntonized with not the frequency of regulated alternating current source but the frequency of actual wave form and then to specify the power consumption of the load.

Further, in the case of the alternating-current source is a three-phase alternating-current source, phase-unbalance, unbalance between each ripple depending on unevenness of voltage between respective phases for instance, may arise. Thus, threshold determination of the power consumption under the load is preferably performed to the power consumption under the load within a time period corresponding to one to ten ripples, for example. A three-phase alternating-current source tends to repeat the same ripple pattern by every three ripples. Consequently, the threshold determination corresponding to the power consumption under the load for a period of three ripples or a multiple thereof further reduce the flaps of the determination result.

In present embodiment, the ripple current superimposed on the load current iL appears with a half-cycle at respective voltage wave from VZ1 to VZ3 in the three-phase alternating-current source of the power source 1 shown as VZ in FIG. 4. The phases of voltage wave forms of respective phases are shifted 120° each so that the ripple appears with a cycle of ⅙ of one cycle of one voltage form in the three-phase alternating-current source.

So, the control circuit 43, shown as GP in FIG. 4, is syntonized with the zero-cross pulse ZCP based on input zero-cross pulse ZCP, and internally generates pulse GP repeating with a cycle of ⅓ of one cycle T of the zero-cross pulse ZCP (cycle of ⅙ of one cycle of one voltage wave form in three-phase alternating-current source) T a.

As shown with Pn of FIG. 4, an effective value voltage of the load voltage VS and an effective value of current of the load current iL are evaluated by every period of the cycle T' with synchronization of generated pulse GP. And then, the power consumption (such as apparent power) under the X-ray generation unit 3 Pn can be specified based on the effective values of voltage and the effective values of current.

The control circuit 43 performs threshold determination to a representative value of consumption power under the X-ray generating unit 3 Pn specified in the most recent N times and determines start/end of the charge control/discharge control of the bulk capacitor 42. As the representative value, for example, an average value, an intermediate value, a middle value, or a value corresponding to an apparent value can be considered, but here an average value is used as one example. $\Sigma Pn/3$ in FIG. 4, as one example, shows an average value $\Sigma Pn/3$ of the power consumption under the X-ray generating unit 3 Pn when the number of times N is 3. Note that from now on, the average value of the power consumption of the X-ray generating unit 3 Pn specified in the most recent N times is called recent load power and shown as $\Sigma Pn/N$.

With this way, flaps of results by the threshold determination of the power consumption under the load can be eliminated and charge-discharge control can be stabilized. Further, it can deal with the power source frequency that changes delicately due to facilities where the X-ray CT system is placed or the phase imbalance. Moreover, it can be dealt with both the three-phase alternating-current power and single-phase alternating-current power.

In fact, it is preferable that the control circuit 43 is comprised of not an analog circuit but a digital IC which is configurable, such as FPGA (Field Programmable Gate Array) and its control is preferably performed by a digital control. The digital control does not become complication of the circuit for calculation of electric power, then can achieve setting change flexibility. For example, changing electric power under control (maximum electric power burden by system power) depending on system ability or store capacity of each facility) can be easier. Further, changing the setting of, for example, the thresholds of the power consumption under the load which starts the discharge, the thresholds of the power consumption under the load which start the charge can be easier.

Present embodiment comprises the zero-cross pulse generating circuit 44 and based on the zero-cross pulse, the power consumption Pn is specified by syntonizing the frequency of actual voltage wave form of the power source 1 which is an alternating-current source. However, instead of the zero pulse generating circuit, a pulse generating circuit which generates pulse by fixing a frequency to a regulated frequency or predetermined times of the frequency of the power source 1 as an alternating-current source can be comprised, and based on the pulse, power consumption Pn can be specified by syntonizing the regulated frequency of the power source. With this configuration, for example in a case that the frequency fluctuation of the actual voltage wave form of the power source 1 is small and the phase balance is well, relatively stable charge-discharge control can be performed.

Next, the flow of the system power leveling process is explained.

Figure 5:
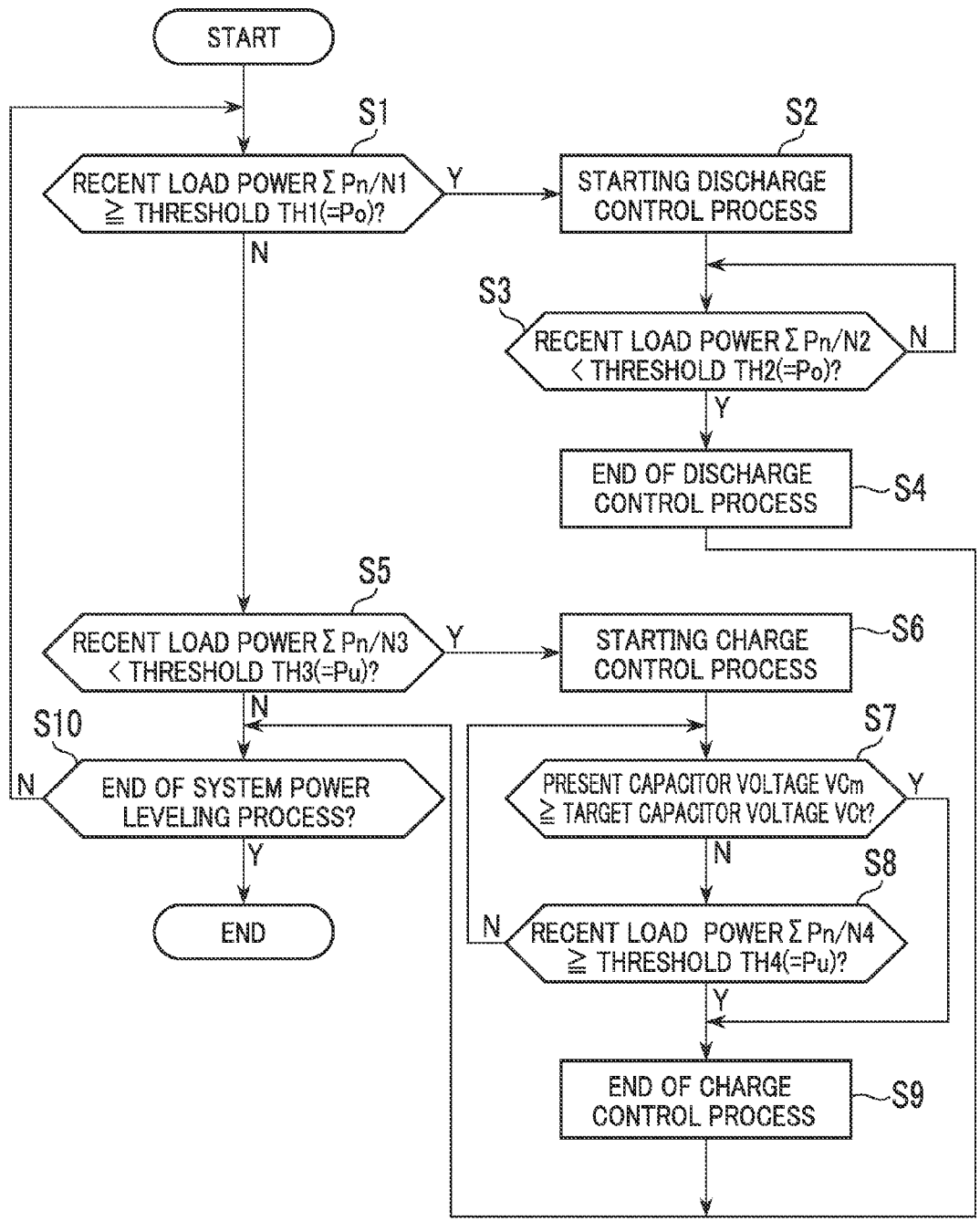
FIG. 5 is one example of flow chart of system power stabilizing process by the control circuit.

FIG. 5 is a flow chart of the system power leveling process by the control circuit 43.

In step S1, the control circuit 43 evaluates recent load power $\Sigma Pn/N1$ and determines whether or not the $\Sigma Pn/N1$ is equal to or more than the first threshold TH1. When the recent load power $\Sigma Pn/N1$ is determined that it is equal to or more than the first threshold TH1, it is recognized that the system power is large and burden is heavy to the system, and move on to the next step S2. On the other hand, when the recent load power $\Sigma Pn/N1$ is determined that it is less than the first threshold TH1, move on to step S5.

In step S2, the control circuit 43 starts the discharge control process of the bulk capacitor 42. Then, move on to step S3. The discharge control process will be explained later in detail.

In step S3, the control circuit 43 evaluates recent load power $\Sigma Pn/N2$ and determines whether or not the recent load power $\Sigma Pn/N2$ is less than the second threshold TH2 ($\leq$TH1). When the recent load power $\Sigma Pn/N2$ is determined that it is less than the second threshold TH2, it is recognized that the system power is not large and the burden is not heavy to the system, and move on to step S4. On the other hand, when the recent load electric $\Sigma Pn/N2$ is determined that it is equal to or more than the second threshold TH2, it is recognized that the burden to the system is still heavy, thus move back to step S3 and the discharging control process of the bulk capacitor 42 is continued.

In step S4, the discharging control process of the bulk capacitor 42 is ended. Then, move on to next step S10.

In step S5, the control circuit 43 evaluates recent load power $\Sigma Pn/N3$ and determines whether or not the recent load power $\Sigma Pn/N3$ is less than the third threshold TH3 (<TH2). When the recent load power $\Sigma Pn/N3$ is determined that it is less than the third threshold TH3, it is recognized that the system power is small and the burden to the system power is less, and move on to step S6. On the other hand, the recent load power $\Sigma Pn/N3$ is determined that it is equal to or more than the third threshold TH3, it is recognized that the system power is not small and the burden to the system is not small, and move on to step S10.

In step S6, the control circuit 43 starts charging control process of the bulk capacitor 42. Then, move on to step S7. The charging control process will be explained later in detail.

In step S7, the control circuit 43 determines whether or not the present value VCm of the capacitor voltage VC is equal to or more than the target value VCt of the capacitor voltage VC. The target voltage VCt is generally set 90 to 98% of the rated voltage of the bulk capacitor 42. When the present value VCm is determined equal to or more than the target value VCt, it is recognized that the bulk capacitor 42 is fully charged, and move on to next step S9. On the other hand, when the present value VCm is determined less than the target value VCt, move on to step S8.

In step S8, the control circuit 43 evaluates recent load power $\Sigma Pn/N4$ and determines whether or not the recent load power $\Sigma Pn/N4$ is equal to or more than the fourth threshold TH4 (<TH2, $\geq$TH3). When the immediate load electric power $\Sigma Pn/N4$ is determined that it is equal to or more than the fourth threshold TH4, it is recognized that the system power is not small and the burden to the system power is not small, and move on to step S9. On the other hand, the recent load power $\Sigma Pn/N4$ is determined that it is less than the fourth threshold TH4, move back to step S7.

In step S9, the charging control process of the bulk capacitor 42 is ended. Then, move on to next step S10.

In step S10, based on various information, it is determined whether or not to stop the system power leveling process. When it is determined to stop, the system power leveling process is ended. On the other hand, when it is determined to continue, move back to the step S1 and the system power leveling process is continued.

However, the threshold TH1 to TH4 has a relationship of TH1$\geq$TH2>TH4$\geq$TH3. The numerical values of number of times N1 to N4 and threshold TH1 to TH4 have characteristics to determine sensitivity against change of the actual power consumption under the X-ray generating unit 3 to determine start/end for charge-discharge control process. If the N1 to N4 are set smaller, a number of samples contributing the average value of the effective power consumption in the X-ray generation unit 3 decreases, thus the variation of the average value becomes rapid and the variation range becomes larger. In this case, above-mentioned sensitivity becomes higher. Adversely, if the N1 to N4 is set larger, the number of samples contributing the average value of effective power consumption in the X-ray generation unit 3 increases, thus the variation of the average value becomes slow and the variation range becomes smaller. In this case, above-mentioned sensitivity becomes lower. Additionally, when the threshold is set as a relationship of TH1>TH2, TH4>TH3, in the threshold determination by the average value of the actual power consumption under the X-ray generating unit 3 that is related to determination of start/end for charge-discharge control process, a difference is generated between the threshold used for determining "start" and the threshold used for determining "end". therefore provides so called hysteresis in the threshold determination. When the difference between the threshold TH1 and TH2, and the difference between the threshold TH3 and TH4 are made larger, the difference between the threshold used for determining "start" and the threshold used for determining "end" become wider so that the hysteresis in the threshold determination becomes wider. In this case, the above-mentioned sensitivity becomes lower.

Figure 6:
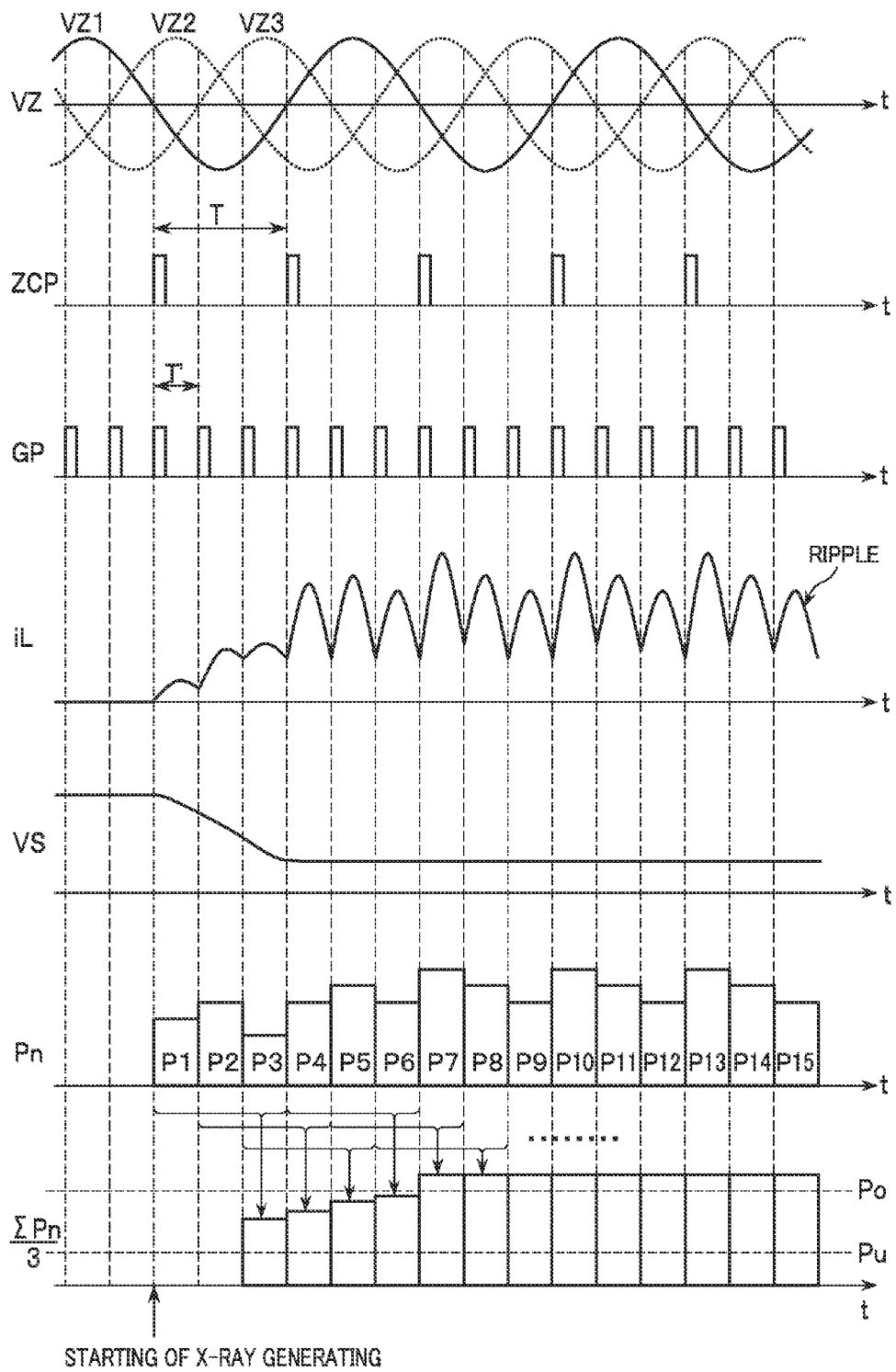
FIG. 6 shows one example of the threshold setting of threshold determination for determining start/end of the charge-discharge control process.

In view of rapidness or its variation range against variation of the power consumption under the X-ray generating unit 3, the number of times N1 to N4 are preferably to be an integer number, within a range between 1 to 10, for example. Further, the thresholds TH1 to TH4 are preferably determined after observing the circuit operation at actual charge-discharge control. Here, as one example, it is set as N1=N2=N3=N4=3 and TH1=TH2=Po>Th4=TH3=Pu. The thresholds Po, Pu are, as shown in FIG. 6 for example, that Po is slightly smaller value than the recent load power ΣPn/3 at generation of X-ray, and Pu is slightly larger value than the recent load power ΣPn/3 at non-generation of X-ray.

Next, charge-discharge control process by the control circuit 43 is explained. Note that as one of charge-discharge control processes, there is a method for controlling charge-discharge power of the bulk capacitor 42, but for easier control, a method for controlling charge-discharge current of the bulk capacitor 42 is adopted here. Also, in the charging control, the current direction of the capacitor current iC flowing into the bulk capacitor 42 during charging is defined positive, and in the discharging control, the current direction of the capacitor current iC flowing into the bulk capacitor 42 during discharging is defined positive.

Figure 7:
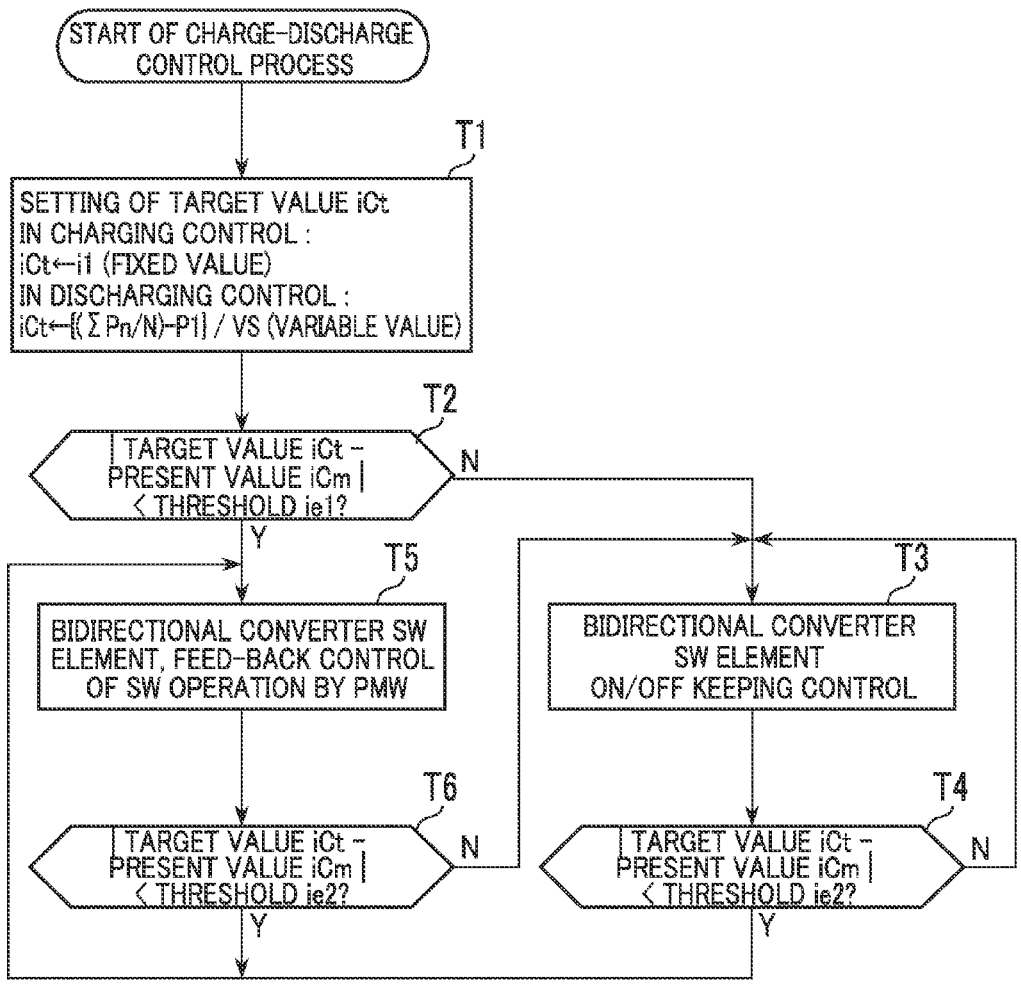
FIG. 7 is a flow chart showing one example of the charge-discharge control process.

FIG. 7 is a flow chart showing the charge-discharge control process.

In step T1, a target value iCt of the capacitor current iC is set in the charge-discharge control process.

In case of discharging control here, the power consumption under the X-ray generating unit 3 except for a electric power under control (maximum electric power burdened by the system bus line power) is compensated by the electric power discharged from the bulk capacitor 42. So, the target value iCt is set as {recent load power ΣPn/N5−electric power under control Pa}/capacitor voltage VC. The number of time N5 is an integer number, such as 1 to 10, as one example, N5=3. Also, the target value iCt in the discharging control is a variable value which is renewed sequentially.

In case of charging control, the target value iCt can be a variable value which is renewed sequentially depending on the power consumption under the X-ray generating unit 3, but here, the target value iCt is set as a fixed value i1 for easier control of the charge. The fixed value i1 is, as one example, about i1=20[A].

In step T2, it is determined whether or not the difference |iCt−iCm|, the difference between the target value iCt and the present value iCm of the capacitor current iC is smaller than the predetermined threshold ie1 (second threshold in the present invention). Here, the threshold ie1 is a value set as a criterion for determining that the target value iCt and the present value iCm are away from one another. When the difference |iCt−iCm| is determined larger than the threshold ie1, move on to step T3. Meanwhile, when the difference |iCt−iCm| is determined less than the threshold ie1, move on to step T5.

In step T3, as shown next, depending on conditions, the control is started to keep the first switching element 411 turn "on" or "off" and to keep the second switching element 412 turn "on" or "off".

In case of the discharging control and the target value iCt> the present value iCm, the second switching element 412 is kept "on" while the first switching element 411 is kept "off". In this condition, the capacitor current iC keeps rising.

In case of the discharging control and the target value iCt< the present value iCm, the second switching element 412 is kept "off" while the first switching element 411 is kept "off". In this condition, the capacitor current iC keeps lowering.

In case of the charging control and the target value iCt> the present value iCm, the first switching element 411 is kept "on" while the second switching element 412 is kept "off". In this condition, the capacitor current iC keeps rising.

In case of the charging control and the target value iCt< the present value iCm, the first switching element 411 is kept "off" while the second switching element 412 is kept "off". In this condition, the capacitor current iC keeps lowering.

After the step T3, move on to step T4.

In step T4, it is determined whether or not the difference |iCt−iCm|, the difference between the target value iCt and the present value iCm of the capacitor current iC is smaller than the threshold ie2 (first threshold in the present invention) which is smaller than the threshold ie1. Here, the threshold ie2 is a value set as a criterion for determining that the target value iCt and the present value iCm are close to one another. The thresholds ie1 and ie2 are set in view of, for example, a constant number of the reactor 413, switching frequency of the second switching element 412, the target value iCt of the capacitor current, the capacitance of the bulk capacitor 42, sampling frequency of the power consumption under the X-ray generating unit 3, and so on.

In this determination, if the difference |iCt−iCm| is determined that it is smaller than the threshold ie2, move on to step T5. Meanwhile, if the difference |iCt−iCm| is determined that it is equal to or more than the threshold ie2, move back to step T3.

In step T5, while one of the first switching element 411 and the second switching element 412 is kept "off", switching operation is performed on the other by the pulse width modulation and controlling of the feed-back control of duty ratio of the pulse width modulation is started (if it is already started, is continued) such that the present value iCm of the capacitor current iC approaches the target value iCt.

Under this control, in case of the discharging control, the first switching element 411 is turned "off" and switching operation is performed on the second switching element 412. In case of the charging control, the second switching element 412 is turned "off" and switching operation is performed on the first switching element 411. After the step T5, move on to step T6.

As above-mentioned feed-back control, it can be thought that it includes, for example, the PID control, the H-infinity (∞) control, or the LQI control.

In step T6, it is determined whether or not the difference |iCt−iCm| between the target value iCt and the present value iCm of the capacitor current iC is smaller than the threshold ie2. When the difference |iCt−iCm| is determined that it is smaller than the threshold ie2, move back to step T5. Meanwhile, the difference |iCt−iCm| is determined that it is equal to or more than the threshold ie2, move back to step T3.

According to such charge-discharge control process, first of all, confirming whether the target value and the present value of the capacitor current iC are away or not by determining whether or not the difference |iCt−iCm| between the target value iCt and the present value iCm of the capacitor current iC is larger than the threshold ie1. Then, when the difference |iCt−iCm| is determined it is larger than the threshold ie1, that is the target value and the present value of the capacitor current iC are recognized they are away, control for keeping the second switching element 412 either "on" or "off" is performed (hereafter, this control is referred as "on/off keeping control") until the difference |iCt−iCm| becomes smaller than the threshold ie2. As a result, the capacitor current iC is risen or lowered at once near the target value. The on/off keeping control is not a feed back control so that it does not accompany a transitional phenomenon, such as overshoot. After that, the switching operation of the second switching element 412 is performed by the pulse width modulation, and the control is changed to the feed-back control of the duty ratio of the pulse width modulation (hereafter, this control is referred as "PWM feed back control") such that the present value iCm of the capacitor current iC approaches the target value iCt. As a result, the capacitor current iC which has risen or lowered near the target value is further moved closer to the target value.

In a case of charging control, while both the first switching element 411 is turned "on" by the on/off keeping control and the first switching element 411 is switched to "on" and "off" after switching to PMW feed-back control, the current still flows from the system bus line 9 to the bidirectional converter 4. In a case of the discharging control, while the second switching element 412 is turned "on" by the on/off keeping control, the current does not flow from the system bus line 9 to the bidirectional converter 4, but after the control is switched to the PWM feed-back control and the second switching element 412 is turned off, the electric energy stored in the reactor 413 by discharging of the bulk capacitor 42 flows in a large current to the system bus line 9.

Meanwhile, in the determination at the step T2, when the difference |iCt−iCm| is determined that it is equal to or less than the threshold ie1, or the target value and the present value of the capacitor current iC are recognized as close, the PWM feed-back control is performed immediately. Thus, the capacitor current iC is converged to the target value.

Further, in the case when the difference |iCt−iCm| exceeds the threshold ie1 during performing of the PWM feed-back control, it is shifted to the on/off keeping control.

As just described, the control with either the on/off maintaining control or the PWM feed-back control as the situation demands, in other words, "hybrid control" is performed, the capacitor current iC in the discharging control, or charged/discharged current of the bulk capacitor 42 can be converged rapidly to the target value without accompanying a transitional phenomenon, such as overshoot.

Figure 8:
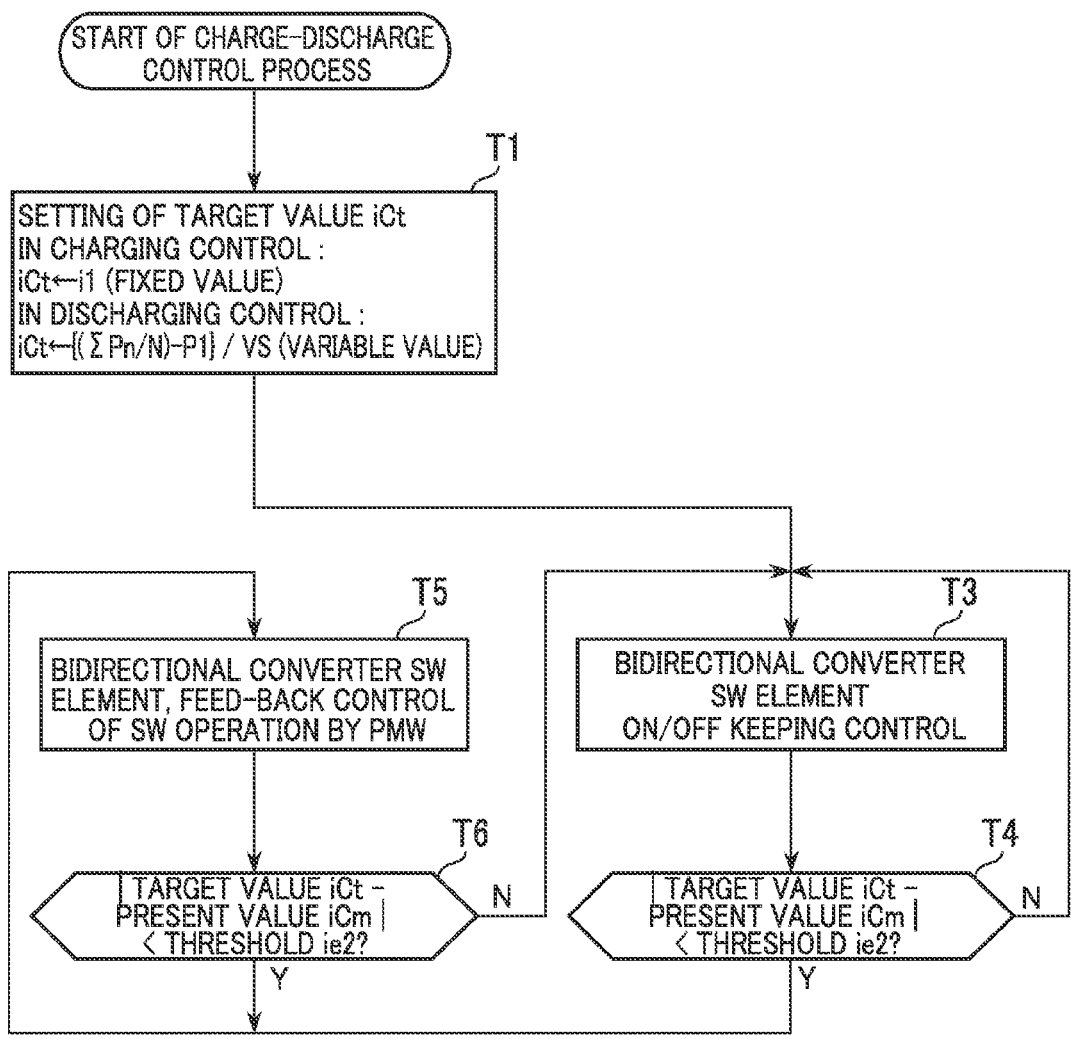
FIG. 8 is a flow chart showing another example of the charge-discharge control process.

Note that as shown in FIG. 8, the step of the threshold determination of the difference |iCt−iCm| of the above-mentioned step T2 can be removed, that is to move on to the step T3 after the step T1 and the charge-discharge control with on/off keeping control can be started immediately.

Figure 9:
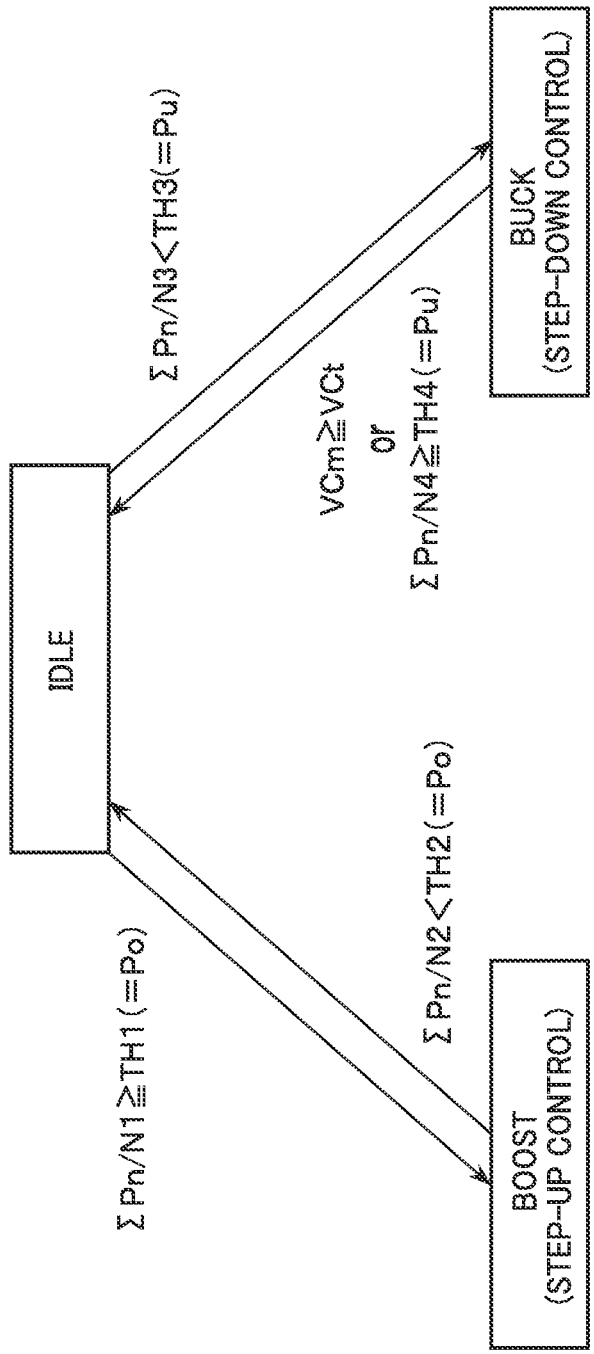
FIG. 9 is a state transition diagram of one example of the system power leveling process shown in FIG. 5.
Figure 10:
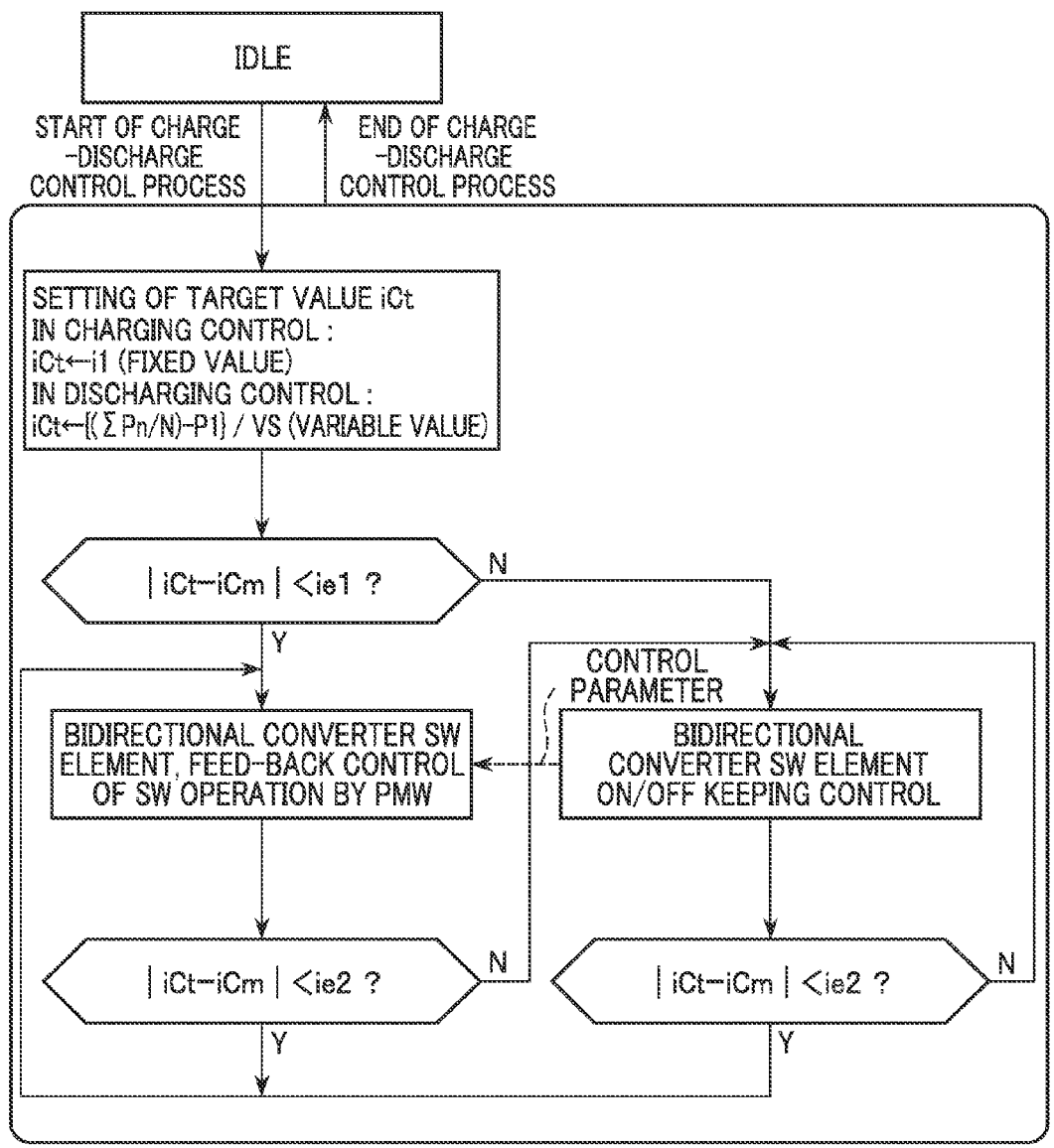
FIG. 10 is a state transition diagram of one example of the charge-discharge control process shown in FIG. 7.
Figure 11:
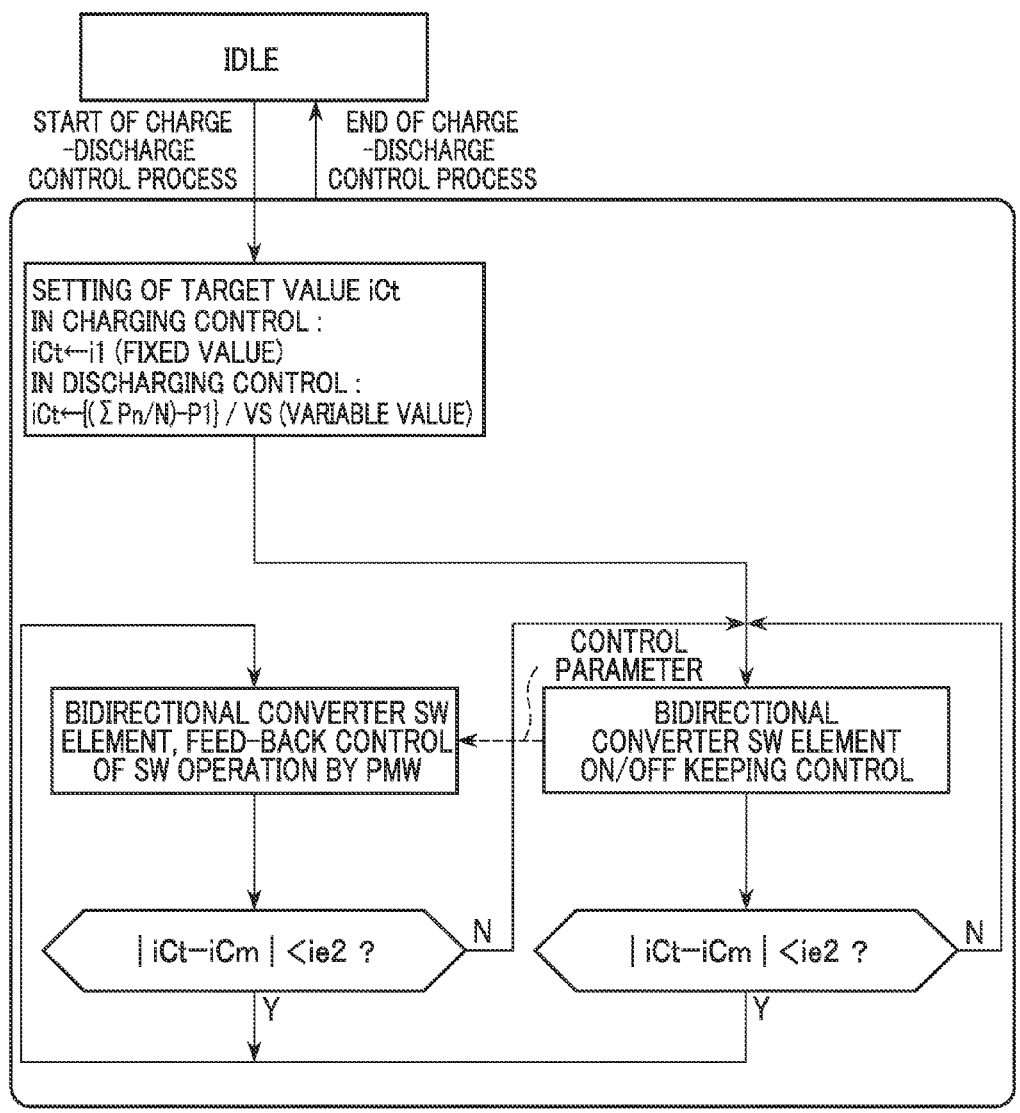
FIG. 11 is a state transition diagram of another example of the charge-discharge control process.

In addition, FIG. 9 to FIG. 11 are figures showing state transition diagrams where the control circuit 43 is considered as a state machine. FIG. 9 shows one example of the system power leveling process shown in FIG. 5, FIG. 10 shows one example of the charge-discharge control process shown in FIG. 7, and FIG. 11 shows another example of the charge-discharge control process shown in FIG. 8. In those figures, the "Iidle" state is a condition that neither charging nor discharging control is in operation. Also, in the charge-discharge control, when the on/off keeping control is shifted to the PWM feed-back control, a control parameter used in the on/off keeping control is used at the beginning of the PWM feed back control.

Figure 12A:
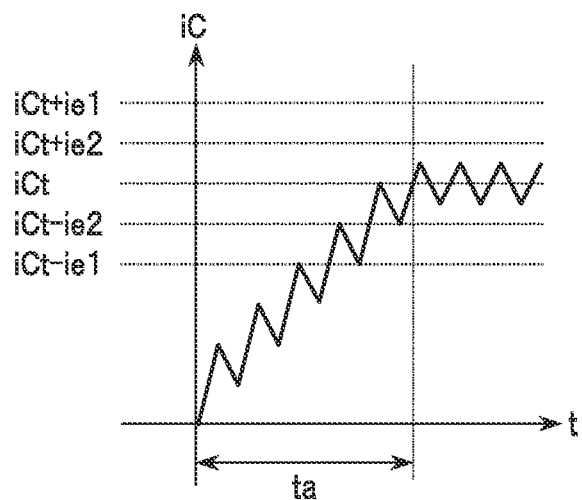
FIGS. 12A, 12B, and 12C show the time change of the capacitor current from beginning of the charge-discharge control.
Figure 12B:
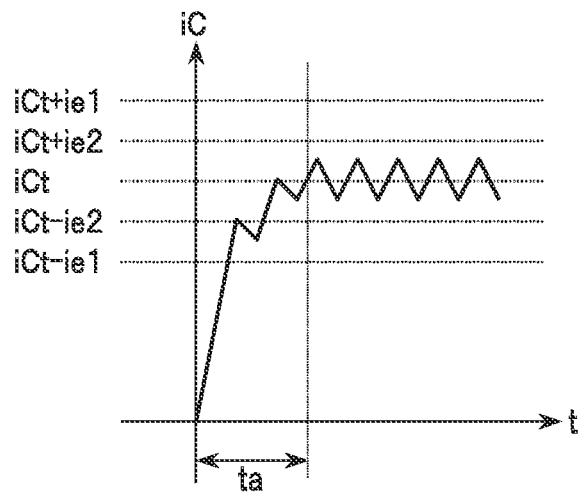
Figure 12C:
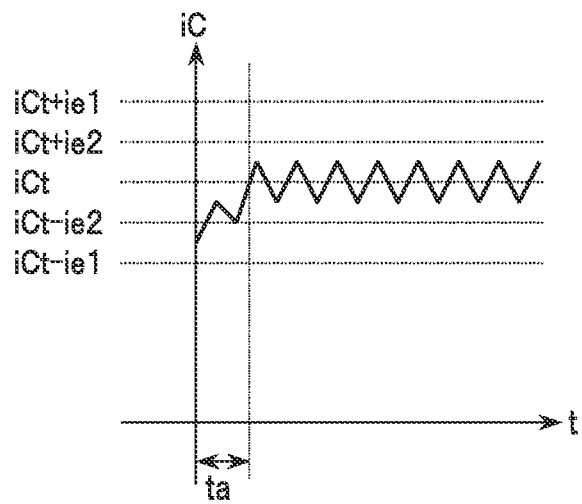

FIGS. 12A-12C the time change of the capacitor current iC after the charge-discharge control is started. In each graph, the horizontal axis indicates time t, and the vertical axis indicates the capacitor current iC. The graph of FIG. 12A shows one example that the switching operation of the switching element in the bidirectional converter 41 is started by the PID control using PWM as a conventional manner with the target value and the present value of the capacitor current iC are away. The graph of FIG. 12B shows one example that the switching operation of the switching element in the bidirectional converter 41 is started by the hybrid control of present embodiment with the target value and the present value of the capacitor current iC are away. The graph of FIG. 12C shows one example that the switching operation of the switching element in the bidirectional converter 41 is started by the hybrid control of present embodiment with the target value and the present value of the capacitor current iC are close.

As shown in FIG. 12A, in the PID control using conventional PWM, the switching operation of the switching element is performed at the beginning of the control so that the capacitor current iC approaches the target value gradually, repeating rising and lowering. Therefore, if the capacitor current iC is away from the target value iCt at the beginning of the control, the time ta that the capacitor current iC converges to the target value iCt becomes longer.

Meanwhile as shown in 12B, in the hybrid control of present embodiment, if the capacitor current iC is away from the target value iCt at the beginning of the control, the capacitor current iC is risen or lowered at once to approach to a range of iCt±ie2 while the switching element is kept "on" or "off". Therefore the time ta that the capacitor current iC converges to the target value iCt can be shortened.

As shown in FIG. 12C, at the hybrid control of present embodiment, if the capacitor current iC is near the target value iCt almost within a range of iCt±ie2, the PID control using the conventional PWM is started so that the capacitor current iC converges to the target value iCt with natural movements as usual.

According to the embodiments, in charge-discharge control of the bulk capacitor 42, instead of performing the feed-back control to turn "on" or "off" the switching elements of the bidirectional converter 41 by the pulse width modulation suddenly, once the switching elements are kept "on" and "off", the switching elements are feed-back controlled with the pulse width modulation after rising or lowering the charged or discharged current close to the target value. Therefore, even if the charged or discharged current is away from the target value, the charged or discharged current or voltage can be converged rapidly to the target value without accompanying a transitional phenomenon, such as overshoot, and the system power can be leveled even if the power consumption of the load changes rapidly and widely.

It will be understood that example embodiments of present invention are intended that the disclosure not be limited to the particular embodiment and can be modified in various way without departing from the sprit and scope of the invention.

For example, in this embodiment the power source 1 is a three-phase alternating-current power source, but it can be a single phase alternating-current power source or a DC power source. When the power source 1 is a single phase alternating-current power source, the power consumption in the X-ray generating unit 3 Pn is specified by being synchronized with a zero-cross pulse ZCP, for example. When the power source 1 is a DC power source, the AC-DC converter 2 and the zero-cross pulse generating circuit 44 are not needed and the power consumption at the X-ray generating unit 3 Pn is specified at appropriate time intervals.

Further, for example, present embodiments show examples of the system power leveling device applied to the image diagnostic system performing X-ray CT photography. However, the system power leveling device will be applied to an image diagnostic system performing simple X-ray photography comprising an X-ray generating unit as a part of a load, or an image diagnostic system performing MR photography comprising a magnetic filed as a part of a load within a scope of embodiments of present invention. Further, the system power leveling system can be applied to other electrical equipments besides such image diagnostic system within a scope of embodiments of present invention.

What is claimed is:

1. A system power leveling device comprising:
a bidirectional converter connected to a system bus line providing electric power to a load from a power source, the bidirectional converter comprising a first switching element and a second switching element;
a power storage device connected to the bidirectional converter;
a first specifying section configured to specify a power consumption of the load;
a charge-discharge control section configured to control charging and discharging of the power storage device by controlling the bidirectional converter based on the specified power consumption; and
a second specifying section configured to specify one of a current and an electric power of the charge or the discharge, wherein the charge-discharge control section comprises:
 a first on/off control section configured to:
  deactivate a first of the first switching element and the second switching element when the power storage device is charging or discharging;
  one of activate and deactivate a second of the first switching element and the second switching element until a difference between a target value of the current or the electric power of the charge or the discharge and the specified value specified by the second specifying section becomes smaller than a first threshold; and
  perform a first feed-back control such that the specified value approaches the target value, by using a pulse width modulation for a on/off operation of the second of the first switching element and the second switching element;
 a determining section configured to determine whether the difference is larger than a second threshold which is larger than the first threshold, when starting the charge or the discharge; and
 a second on/off control section configured to:
  when the charge or the discharge is performed, while one of the first and the second switching elements is kept off, deactivate the first of the first switching element and the second switching element when the power storage device is charging or discharging; and
  perform a second feed-back control such that the specified value approaches target value, by using a pulse width modulation for an on/off operation of the second of the first switching element and the second switching element, wherein when the difference is determined to be larger than the second threshold by the determining section, the first feed-back control by the first on/off control section is performed, and when the difference is determined equal to or less than the second threshold by the determining section, the second feed-back control by the second on/off control section is performed.

2. The system power leveling device according to claim 1, wherein:
the power source comprises an alternating-current power source;
the first specifying section is configured to specify the power consumption of the load at a cycle of a wave form of the alternating-current power source or at every period of a predetermined number of the cycle; and
the charge-discharge control section is configured to control the charge and discharge based on most recent predetermined number of times of the power consumption specified by the first specifying section.

3. The system power leveling device according to claim 2, wherein the predetermined number of times is an integral number within a range from 1 to 10.

4. The system power leveling device according to claim 2, wherein the first specifying section is synchronized with a zero-cross phase of the alternating-current power source and specifies the power consumption of the load.

5. The system power leveling device according to, claim 2 wherein:
the charge-discharge control section is configured to start the charge when a representing value of the power consumption for most recent N1 cycle specified at the first specifying section becomes less than a threshold TH1, and to end the charge when a representing value of the power consumption for most recent N2 cycle of specified at the first specifying section becomes equal to or more than a threshold TH2;
the charge-discharge control section is configured to start the discharge when a representing value of the power consumption for most recent N3 cycle specified at the first specifying section becomes equal to or more than a threshold TH3, and to end the discharge when a representing value of the power consumption for most recent N4 cycle specified at the first specifying section becomes less than a threshold TH4; and
TH1, TH2, TH3, and TH4 are in a relationship of TH1≥TH2>TH4≥TH3.

6. The system power leveling device of claim 5, wherein the N1, N2, N3, and N4 are integer numbers within a range from 1 to 10.

7. The system power leveling device of claim 6, wherein:
the alternating-current power source comprises a three-phase alternating-current power source;
the first specifying section is configured to specify the power consumption of the load at every period of ⅙ of the cycle; and
N1, N2, N3, and N4 are N1=N2=N3=N4=3.

8. The system power leveling device according to claim 5, wherein at least one of combinations of the TH1 and TH2, and the TH3 and TH4 is a combination of values different from one another.

9. The system power leveling device according to claim 5, wherein the target value of the electric power of the charge is an electric power value evaluated by subtracting a maximum electric power burdening the power source from a representing value of the power consumption for most recent N5 cycle specified at the first specifying section.

10. The system power leveling device according to claim 5, wherein the representing value is an average value, an intermediate value, a middle value, or a value corresponding to an apparent value.

11. The system power leveling device according to claim 1, wherein the target value of the current of the charge is a predetermined fixed value.

12. The system power leveling device according to claim 1, wherein the first feed-back control includes PID control, H-infinity ($\infty$) control, or LQI control.

13. The system power leveling device according to claim 1, wherein the power storage device comprises an electric double layer capacitor.

14. An image diagnostic system comprising:
a load; and
a system power leveling device comprising:

a bidirectional converter connected to a system bus line providing a electric power to the load from a power source, the bidirectional converter comprising a first switching element and a second switching element;

a power storage device connected to the bidirectional converter;

a first specifying section configured to specify a power consumption of the load;

a charge-discharge control section configured to control charging and discharging of the power storage device by controlling the bidirectional converter based on the specified power consumption; and a second specifying section configured to specify one of a current and an electric power of the charge or the discharge, wherein the charge-discharge control section comprises:

a first on/off control section configured to:

deactivate a first of the first switching element and the second switching element when the power storage device is charging or discharging;

one of activate and deactivate a second of the first switching element and the second switching element until a difference between a target value of the current or the electric power of the charge or the discharge and the specified value specified by the second specifying section becomes smaller than a first threshold; and perform a first feed-back control such that the specified value approaches the target value, by using a pulse width modulation for a on/off operation of the second of the first switching element and the second switching element;

a determining section configured to determine whether the difference is larger than a second threshold which is larger than the first threshold, when starting the charge or the discharge; and a second on/off control section configured to:

when the charge or the discharge is performed, while one of the first and the second switching elements is kept off, deactivate the first of the first switching element and the second switching element when the power storage device is charging or discharging; and Perform a second feed-back control such that the specified value approaches the target value, by using a pulse width modulation for an on/off operation of the second of the first switching element and the second switching element, wherein when the difference is determined lager than the second threshold by the determining section, the first on/off control section performs the first feed-back control, and when the difference is determined equal to or less than the second threshold by the determining section, the second on/off control section performs the second feed-back control.

15. The image diagnostic system according to claim 14, wherein the load comprises an X-ray generating unit configured to perform X-ray CT photography.

16. The image diagnostic system according to claim 14, wherein the load comprises an X-ray generating unit configured to perform X-ray photography.

17. The image diagnostic system according to claim 14, wherein the load comprises a magnetic field generating unit configured to perform MR photography.

18. The image diagnostic system according to claim 14, wherein:

the power source comprises an alternating-current power source;

the first specifying section is configured to specify the power consumption of the load at a cycle of a wave form of the alternating-current power source or at every period of a predetermined number of the cycle; and the charge-discharge control section is configured to control the charge and discharge based on most recent predetermined number of times of the power consumption specified by the first specifying section.

\* \* \* \* \*